United States Patent [19]

Murphey et al.

[11] Patent Number: 5,232,961
[45] Date of Patent: Aug. 3, 1993

[54] HARDENABLE RESIN COMPOSITIONS AND METHODS

[76] Inventors: Joseph R. Murphey, 2218 Spruce; Kenneth D. Totty, Rte. 1, Box 67; Randy Anderson, 901 Daryl Pl., all of Duncan, Okla. 73533

[21] Appl. No.: 746,850

[22] Filed: Aug. 19, 1991

[51] Int. Cl.$^5$ .................. C08G 59/50; C18L 63/00
[52] U.S. Cl. .................. 523/414; 528/111; 523/131; 523/209
[58] Field of Search .............. 523/455, 209, 131, 414; 528/111

[56] References Cited

U.S. PATENT DOCUMENTS

| | | | |
|---|---|---|---|
| 2,553,718 | 7/1949 | Newey | 523/455 |
| 3,141,825 | 7/1964 | Goldemberg et al. | 528/98 |
| 3,625,287 | 12/1971 | Young | 166/295 |
| 3,645,969 | 2/1972 | Harvey | 523/455 |
| 3,790,522 | 2/1974 | Bliss | 523/455 |
| 4,074,760 | 2/1978 | Copeland et al. | 166/276 |
| 4,101,474 | 7/1978 | Copeland et al. | 260/13 |
| 4,119,609 | 10/1978 | Allen et al. | 528/99 |
| 4,197,389 | 4/1980 | Becker et al. | 528/103 |
| 4,199,484 | 4/1980 | Murphey | 260/13 |
| 4,247,430 | 1/1981 | Constien | 260/29.2 EP |
| 4,721,770 | 1/1988 | Stockinger et al. | 528/109 |
| 4,829,100 | 5/1989 | Murphey et al. | 523/131 |
| 4,942,186 | 7/1990 | Murphey et al. | 523/131 |

FOREIGN PATENT DOCUMENTS 20005277 4/1979 United Kingdom ............. 523/131

Primary Examiner—Paul R. Michl
Assistant Examiner—John J. Guarriello

[57] ABSTRACT

Improved hardenable resin compositions useful in forming hard permeable masses in remote locations or zones are provided. The compositions include hardening agents which are non-hazardous to personnel and which are compatible with other components of the compositions. Methods of continuously forming and suspending particulate material coated with the improved resin compositions in gelled aqueous carrier liquid are also provided.

20 Claims, No Drawings

HARDENABLE RESIN COMPOSITIONS AND METHODS

BACKGROUND OF THE INVENTION

1. Field of the Invention.

This invention relates to improved hardenable resin compositions and methods, and more particularly, to such compositions and methods wherein less hazardous and more compatible hardening agents are utilized.

2. Description of the Prior Art.

Resin compositions useful for consolidating particulate materials into hard permeable masses have been developed and used heretofore. In the oil industry, resin compositions and methods for placing particulate materials coated therewith are used, for example, to form hard permeable masses in subterranean formations containing loose or incompetent sands which migrate with hydrocarbons produced therefrom. The hard permeable masses formed by the consolidated particulate materials reduce or prevent the migration of loose or incompetent sands when placed between the producing formations and the well bores penetrating the formations.

One technique which has heretofore been utilized successfully for forming a consolidated, permeable, particulate mass between a well bore and a producing formation involves coating the formation sand adjacent the well bore with a hardenable resin and then causing the resin to harden. An alternate technique has been to coat sand with a hardenable resin on the surface, to suspend the coated sand in a gelled aqueous carrier liquid and then to pump the suspension by way of the well bore into the formation whereby the resin coated sand is deposited therein. The resin on the deposited sand is caused to harden whereby a solid, permeable, particulate mass is formed.

Methods of continuously forming and suspending consolidatible resin composition coated particulate material in a gelled aqueous carrier liquid and transporting the coated particulate material by way of the gelled aqueous carrier liquid to a zone in which it is consolidated are described in U.S. Pat. No. 4,829,100 issued May 9, 1989. In accordance with such methods, substantially continuous streams of a gelled aqueous carrier liquid, uncoated particulate material, a resin composition which will subsequently harden and a surface active agent are admixed whereby the particulate material is continuously coated with resin composition and suspended in the gelled aqueous carrier liquid.

While the methods and compositions disclosed in Patent No. 4,829,100 have been used successfully, the preferred hardening agents, i.e., hardening agents including methylene dianiline have been found to be carcinogenic and therefore hazardous to personnel, and to be incompatible with some other commonly used components in gelled aqueous fluids such as oxidative gel breakers and the like. Aliphatic amines have been utilized and are well known to those skilled in the art as hardening agents for epoxy resins. However, because such amines are either soluble in or form emulsions with water, they tend to separate from the resin composition while the resin composition is being mixed or placed, and as a result, they often do not satisfactorily cause the resin composition to harden.

Thus, there is a need for an improved hardenable resin composition which is less hazardous to personnel, which is compatible with other components utilized in subterranean formation treating fluids and which causes the resin composition to rapidly harden and develop high strength in the presence of water.

SUMMARY OF THE INVENTION

The present invention meets the need recited above by providing improved hardenable resin compositions and methods of continuously forming and suspending particulate material coated with resin compositions in aqueous carrier liquids.

The resin compositions of this invention are basically comprised of a hardenable polyepoxide resin, one or more substantially water immiscible diluents present in the resin composition in amounts sufficient to lower the viscosity thereof to a desired level and a hardening agent comprised of the adduct formed by reacting an aliphatic amine with the condensation reaction product of epichlorohydrin and bisphenol A. The hardening agent is non-carcinogenic and is compatible with most components utilized in subterranean formation completion and stimulation fluids including oxidative gel breakers.

The above-described resin composition can be dispersed in a gelled aqueous carrier liquid along with particulate material and a surface active agent whereby the particulate material is coated with the resin composition and suspended in the carrier liquid. The resulting composition can be used to deposit the resin coated particulate material in a subterranean zone between a hydrocarbon producing formation and a well bore whereby it is consolidated into a hard permeable particulate mass therein. The permeable particulate mass functions to prevent the migration of loose or incompetent material in the producing formation with hydrocarbons produced therefrom. The gelled aqueous liquid composition containing resin coated particulate material can also be utilized in stimulation procedures such as in subterranean formation fracturing wherein the fractures are maintained open by placing the resin coated particulate material therein and causing it to form a consolidated permeable mass.

Methods of continuously forming and suspending consolidatible resin coated particulate material in a gelled aqueous carrier liquid and transporting the resulting composition to a zone in which the particulate material is to be consolidated are also provided.

It is, therefore, a general object of the present invention to provide improved hardenable resin compositions.

A further object of the present invention is the provision of improved hardenable resin compositions which are particularly suitable for forming a hard permeable mass in a remote location such as in a subterranean zone penetrated by a well bore.

Another object of the present invention is the provision of improved methods of continuously forming and suspending consolidatible resin composition coated particulate material in a gelled aqueous carrier liquid and transporting the coated particulate material to a zone in which the particulate material is to be consolidated.

Other and further objects, features and advantages of the invention will be readily apparent to those skilled in the art upon a reading of the description of preferred embodiments which follows.

DESCRIPTION OF PREFERRED EMBODIMENTS

As mentioned above, hardenable resin compositions useful in forming hard permeable masses in remote locations have been developed and used heretofore. Also, methods of continuously forming and suspending consolidatible resin composition coated particulate material in a gelled aqueous carrier liquid and transporting the coated particulate material by way of the carrier liquid to a zone in which the particulate material is consolidated have been known and used heretofore. U.S. Pat. No. 4,829,100 issued May 9, 1989, which is incorporated herein by reference, discloses such resin compositions and methods. However, the hardening agents most commonly utilized in the resin compositions used for carrying out the methods described in U.S. Pat. No. 4,829,100, i.e., hardening agents including methylene dianiline, present several problems. The most severe problem is that methylene dianiline has been found to be a carcinogenic material and therefore it constitutes a hazard to personnel.

Another problem with the use of hardening agents comprised of methylene dianiline is that methylene dianiline is incompatible with other components utilized in subterranean formation completion and stimulating fluids. For example, gelled fracturing fluids often include delayed gel breakers of the oxidative type such as sodium persulfate. Methylene dianiline adversely reacts with such oxidative compounds to diminish or extinguish their ability to function as gel breakers.

Aliphatic and cycloaliphatic amines are well known in the art as hardening agents for epoxy resins. Such amines are readily available and produce excellent hardening results. However, aliphatic and cycloaliphatic amines are either soluble in water or form emulsions in water whereby they do not function well in the presence of water. That is, the solubility or emulsifying tendencies of amines in water tends to cause amines when used as hardening agents to be separated from the resin thereby diminishing the resin hardening process caused thereby.

The hardening agents of the improved resin compositions and methods of the present invention are comprised of certain adducts of aliphatic or cycloaliphatic amines. The adducts do not prevent the amines from producing rapidly hardened epoxy resins of excellent strengths, but they do obviate the problems associated with water solubility or emulsification described above.

An improved hardenable resin composition of the present invention is comprised of a hardenable polyepoxide resin, one or more substantially water immiscible diluents present in the resin composition in amounts sufficient to lower the viscosity of the composition to a desired level and a hardening agent comprised of an adduct formed by reacting an aliphatic or cycloaliphatic amine with the condensation reaction product of epichlorohydrin and bisphenol A. The term "aliphatic amine" is used hereinafter to mean cycloaliphatic amines as well as straight or branched chain amines.

While a variety of aliphatic amines can be utilized, preferred amines are those selected from the group consisting of ethylene diamine, triethylene tetramine, tetraethylene pentamine, bis-(p-aminocyclohexyl) methane, the diamines and triamines of cyclopentane and the diamines and triamines of cyclohexane, e.g., 1,2-diamino cyclohexane and 1,4-diamino cyclohexane. Of these, triethylene tetramine, 1,2-diamino cyclohexane and 1,4-diamino cyclohexane are more preferred with 1,4-diamino cyclohexane being the most preferred.

The adducts of the aliphatic amines are prepared by prereacting a selected amine with the reaction product of epichlorohydrin and bisphenol A. The condensation reaction product of epichlorohydrin and bisphenol A can be represented as follows:

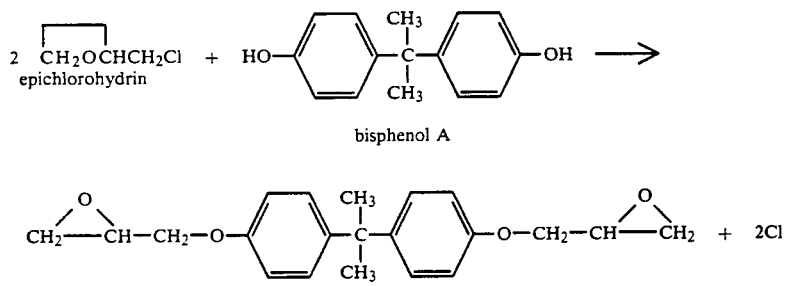

When the condensation reaction product of epichlorohydrin and bisphenol A is reacted with an aliphatic amine, the adduct of the amine is formed. When the amine is, for example, 1,4-diamino cyclohexane, the adduct formation reaction can be represented as follows:

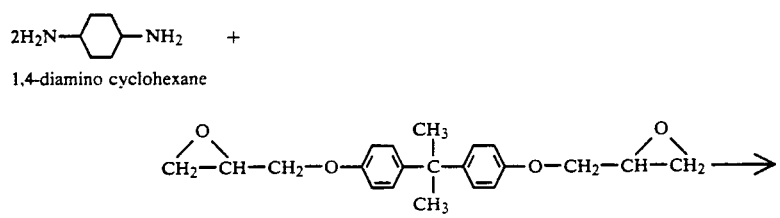

-continued

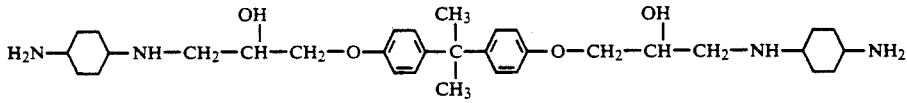

Polyepoxide resins which can be utilized in the above-described hardenable resin composition include condensation products of epichlorohydrin and multiple hydroxy compounds such as resourcinol hydroquinone, glycerine, pentaerythritol, 1,4-butanediol, phloroglucinol, bisphenol A and bisphenol F. The structural formula of bisphenol F is a follows:

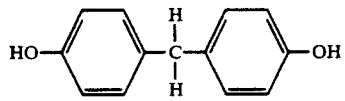

The preferred resins are the condensation resin products of epichlorohydrin and bisphenol A. A commercially available such product is marketed by the Shell Chemical Company of Houston, Tex., under the tradename Epon 828 ™. Epon 828 ™ resin exhibits good temperature stability and chemical resistance, and has a viscosity of about 15,000 centipoises.

The one or more substantially water immiscible diluents utilized in the resin composition are present therein in amounts sufficient to adjust the viscosity of the composition to a desired level, generally a level in the range of from about 100 centipoises to about 800 centipoises. Preferably, two polar organic diluents are used which are miscible with the polyepoxide resin and substantially immiscible with water. One of such diluents is preferably reactive with the epoxy resin component with the other diluent being non-reactive.

The substantially water immiscible reactive diluent is preferably comprised of at least one member selected from the group consisting of butyl glycidyl ether, cresol glycidyl ether, allyl glycidyl ether, phenyl glycidyl ether, diglycidyl ether of 1,4-butanediol (butyl diglycidyl ether) and resorcinol (resorcinol diglycidyl ether) and other glycidyl ethers which are miscible with the epoxy resin utilized. Of these, butyl glycidyl ether and cresol glycidyl ether are the most preferred. The reactive diluent or diluents are generally present in the resin composition in an amount in the range of from about 2 to about 35 parts by weight per 100 parts by weight of the polyepoxy resin present. Preferably, the reactive diluent is present in the range of from about 15 to about 30, and most preferably, about 28 parts by weight per 100 parts by weight of polyepoxide resin.

The substantially water immiscible non-reactive diluent is preferably selected from the group consisting of compounds having the structural formula:

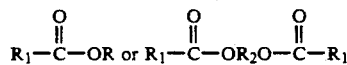

wherein R is $C_nH_{2n+1}$ in which n is an integer in the range of from 1 to about 5; $R_1$ is $C_mH_{2m+1}$ wherein m is an integer in the range of from 1 to about 4, or $R_1$ is

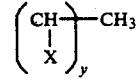

wherein y is an integer in the range of from 1 to about 4 and X is independently H or OH; and $R_2$ is $C_aH_{2a}$ wherein a is an integer in the range of from 2 to about 5.

Of the compounds falling within the above-described group, ethyl acetate, butyl lactate, ethyl lactate, amyl acetate, ethylene glycol diacetate and propylene glycol diacetate are preferred. Of these, butyl lactate is the most preferred.

The substantially water immiscible non-reactive diluent is generally present in the resin composition in the range of from about 4 to about 20 parts by weight per 100 parts by weight of the polyepoxide resin present. Preferably, the non-reactive diluent is present in present in an amount in the range of from about 8 to about 15, and most preferably, about 10 parts by weight per 100 parts by weight of the polyepoxide resin present.

Examples of other diluents which can be utilized are methyl alcohol and other low molecular weight alkanols, tetrahydrofurfuryl methacrylate and ethyl acetate.

The above-described hardening agent, i.e., the adduct formed by reacting an aliphatic amine with the condensation reaction product of epichlorohydrin and bisphenol A, is generally present in the resin composition in an amount in the range of from about 20 to about 150 parts by weight per 100 parts by weight of polyepoxide resin. Preferably, the hardening agent is present in an amount in the range of from about 40 to about 90, and most preferably, about 68 parts by weight per 100 parts of polyepoxide resin.

The hardenable resin composition can also include retarders or accelerators as hardening rate controllers to lengthen or shorten the working and cure times of the resin composition. Low molecular weight organic acid ester retarders such as alkyl esters of alkyl acids containing about 2 to 3 carbon atoms can be utilized. Suitable accelerators include 2,4,6-trisdimethylaminomethylphenol, the ethyl hexonate salt thereof and weak organic acids such as fumaric, erythorbic, ascorbic, salicylic and maleic acids. When a retarder or accelerator is utilized, it is generally combined with the resin composition in amounts up to about 10 parts by weight per 100 parts by weight of polyepoxide resin.

While the above-described hardenable resin composition can be utilized in a variety of applications, it is particularly suitable for use in oil and gas well completion and stimulation procedures. In such applications, the resin is generally utilized to consolidate particulate material, either particulate material admixed with the resin composition and introduced into a subterranean zone by way of a well bore or loose or incompetent particulate material contained within one or more subterranean formations penetrated by the well bore. In such applications, the resin composition preferably also includes a resin to particulate material coupling agent to promote bonding of the resin to the particulate material. A preferred such coupling agent is N-beta-(aminoethyl)-gammaaminopropyltrimethoxysilane. The coupling agent generally can be included in the resin composition in an amount from about 0.1 to about 2 parts by weight per 100 parts by weight of polyepoxide resin.

A composition of the present invention useful in forming a hard permeable mass in a remote location, e.g., a subterranean formation penetrated by a well bore, is comprised of an aqueous liquid, at least one hydratable polysaccharide gelling agent, the above-described resin composition, particulate material such as sand and one or more surface active agents for promoting the coating of the particulate material with the resin composition.

The aqueous liquid can be fresh water, brine or sea water. A variety of hydratable polysaccharide gelling agents can be utilized having molecular weights in the range of from about 100,000 to 4,000,000, preferably from about 600,000 to 2,400,000. Preferably, the polysaccharide polymer gelling agents are cellulose or guar derivatives. The polymers include substituents such as hydroxyethyl to give the necessary water hydration and gel characteristics to produce a clear aqueous gel having a viscosity of at least about 30 centipoises (reading on a Fann V. G. meter at 300 rpm). Preferred such polymers include substituted carboxy and hydroxy alkyl cellulose, such as hydroxyethylcellulose and carboxymethylhydroxyethylcellulose, and substituted hydroxyalkylguar, such as hydroxypropylguar. The most preferred polysaccharide polymer gelling agent is hydroxypropylguar having a molecular weight in the range of from about 100,000 to about 4,000,000, and having a propylene oxide substitution (MS) of about 0.1 to about 0.7 moles of propylene oxide per mole of mannose and galactose in the guar.

The surface active agent for promoting the coating of the particulate material can be one or more cationic surface active agents or one or more non-cationic surface active agents, or one or more of both. As used herein, a noncationic surface active agent includes a blend of anionic and non-ionic surface active agents.

Useful cationic surface active agents include the reaction product of an alcohol, epichlorohydrin and triethylenediamine wherein monohydric aliphatic alcohols having in the range of from about 12 to about 18 carbon atoms are reacted with from 2 to 3 moles of epichlorohydrin per mole of alcohol followed by reaction with an excess of triethylenediamine. The alcohol-epichlorohydrin reaction product contains an ethoxylation chain having pendent chlorides. The subsequent reaction with triethylenediamine provides a cationic and a tertiary amine functionality to the resulting product.

The non-cationic surfactants are preferably ethoxylated fatty acids produced by reacting fatty acids containing from about 12 to about 22 carbon atoms with from about 5 to about 20 moles of ethylene oxide per mole of acid, most preferably from about 12 to about 18 moles of ethylene oxide per mole of acid, to produce a mixture of various quantities of ethoxylated acids and unreacted acids.

When the gelling agent used is a cellulose derivative, one preferred surface active agent is a blend comprised of isopropyl alcohol, the cationic agent described above and the non-cationic agent described above wherein the weight ratio of cationic agent to non-cationic agent in the blend is in the range of from about 0.4 to 1, and preferably about 0.6 parts by weight cationic agent per 1 part by weight non-cationic agent and wherein the weight ratio of isopropyl alcohol to non-cationic agent in the blend is about 1 part by weight alcohol per 1 part by weight non-cationic agent.

When the gelling agent used herein is a galactomannan gum, a preferred surface active agent is a blend comprised of alcohol, e.g., amyl alcohol, the cationic agent described above and the non-cationic agent described above wherein the weight ratio of cationic agent to non-cationic agent in the blend is in the range of 0 to 1, and preferably about 0.2 parts by weight cationic agent per 1 part by weight noncationic agent and wherein the weight ratio of alcohol to noncationic agent in a blend is about 1 part by weight alcohol per 1 part by weight non-cationic agent.

After being prepared, the above-described composition is comprised of resin composition coated particulate material suspended in a gelled aqueous liquid. The gelled aqueous liquid preferably contains the polysaccharide polymer utilized in an amount in the range of from about 20 to about 120 lbs of polymer per 1000 gallons of water, brine or sea water whereby the gelled aqueous liquid has a viscosity in the range of from about 10 centipoises to about 400 centipoises. Most preferably, the gelled aqueous carrier liquid includes from about 30 to about 80 lbs of gelling agent per 1000 gallons of water, brine or sea water, and has a viscosity of from about 15 to about 100 centipoises. As is well understood by those skilled in the art, the gelled aqueous liquid can be crosslinked to increase its viscosity and stability.

The composition is transported to a remote location or zone where the resin coated particulate material is to be deposited and consolidated. For example, the composition can be pumped down a well bore into a zone penetrated thereby adjacent a hydrocarbon producing formation. A gel breaker is preferably included in the gelled aqueous liquid to cause it to revert to a relatively thin liquid at the time the resin coated particulate material reaches the location of the zone. While a variety of gel breakers which are well known in the art can be utilized, an oxidative type of breaker such as sodium persulfate is preferred. Such oxidative gel breakers are generally included in the composition in an amount in the range of from about 0.5 pounds to about 50 pounds per 1000 gallons of gelled aqueous carrier liquid, but the particular amount depends upon the specific time period required between when the gel breaker is added and when the gel must be broken. Increases in the amount of gel breaker shorten such time period. As mentioned above, the resin composition can also include retarders or accelerators as required to lengthen or shorten the working and cure times of the resin composition.

A specific preferred resin composition for use in the above-described composition containing an aqueous liquid, a gelling agent, particulate material, one or more surface active agents and the resin composition is comprised of an epichlorohydrin and bisphenol A epoxy resin present in the resin composition in an amount of about 48% by weight of the composition. A substantially water immiscible reactive diluent comprised of butyl glycidyl ether is present in the composition in an amount of about 6.5% by weight, and a substantially water immiscible non-reactive diluent comprised of butyl lactate is present in the composition in an amount of about 6% by weight. A hardening agent comprised of the adduct formed by reacting 1,4-diamino cyclohexane with the condensation reaction product of epichlorohydrin and bisphenol A is included in the resin composition in an amount of about 35% by weight. An N-beta-(aminoethyl)-gamma-aminopropyltrimethoxysilane coupling agent is present in the composition in an amount of about 1.0% by weight and an accelerator comprised of the ethylhexonate salt of dimethylaminomethylphenol is present in the resin composition in an amount of about 5% by weight of the composition. This resin composition has a viscosity of about 200 centipoises, a working time of about 1.5 hrs. and a cure time of about 8 hrs. at 80° F. When the accelerator is not present in the composition it has a working time of about 7 hrs. and a cure time of about 84 hrs.

In accordance with the methods of the present invention, a gelled aqueous liquid composition containing resin coated particulate material is continuously formed and transported to a remote location. That is, a gelled aqueous liquid is prepared in a storage container by combining a polysaccharide polymer gelling agent of the type described above with fresh water, brine or sea water. The hardenable resin composition described above is prepared in a separate container by mixing the polyepoxide resin used with the substantially water immiscible diluent or diluents used and the hardening agent. Continuous streams of the gelled aqueous liquid, the hardenable resin composition, particulate material, one or more liquid surface active agents and liquid gel breaker are conducted to a continuous mixing apparatus wherein they are mixed and a gelled aqueous carrier liquid having resin composition coated particulate materials suspended therein is formed. The composition is continuously pumped from the mixing apparatus to the remote location where the resin coated particulate material is to be deposited and consolidated into a hard permeable mass, e.g., a subterranean zone penetrated by a well bore. As is well understood by those skilled in the art, the zone may first be conditioned by preflushing with a suitable conditioning liquid and/or after flushes may be used to insure uniform placement, consolidation and maximum permeability of the deposited resin coated particulate material.

In order to further illustrate the compositions and methods of the present invention, the following example is given.

EXAMPLE

Tests were performed to illustrate the differences resulting from the use of the compositions of the present invention including 1,4-diamino cyclohexane-bisphenol A adduct hardener and compositions including methylene dianiline hardener and unmodified amine hardener. The aqueous gel in all tests was comprised of 0.5% by weight of a commercial guar gelling agent and 2% by weight KCl in tap water. In addition 0.3% by weight of a blend of surfactants to promote coating of the mixed epoxy resin onto the sand was included in the gel. This blend was approximately 18% by weight cocobetaine, 25% by weight isopropanol, 29% by weight water, 10% by weight of a mixed ethoxylated (7 moles E.O>) phenol resin, and 18% by weight isoamyl alcohol. The resin compositions which were tested are as follows:

| Resin #1 - Resin Composition Including Methylene Dianiline Hardener | |
|---|---|
| Bisphenol A epoxy resin | 100 parts by weight |
| butyl glycidal ether | 12 parts by weight |
| Silane A-1120 TM (Union Carbide Co.) | 2 parts by weight |
| TONOX-22 TM (UNIROYAL Chemical Co.) | 35 parts by weight |
| (eutectic mixture of methylene dianiline, i.e., 78% by weight, and higher mole weight homologues) | |
| methyl alcohol | 25 parts by weight |
| butyl lactate | 6 parts by weight |
| ethyl hexanoic salt of 2,4,6, tri-(methyl-N-dimethylamine) | 6 parts by weight |

| Resin 2 - Resin Composition of the Present Invention | |
|---|---|
| Bisphenol A epoxy resin | 100 parts by weight |
| butyl glycidal ether | 12 parts by weight |
| Silane A-1120 TM | 2 parts by weight |
| 1-4,diaminocyclohexane adduct of bisphenol A epoxy | 64 parts by weight |
| methyl alcohol | 49 parts by weight |
| butyl lactate | 6 parts by weight |
| ethyl hexanoic salt of 2,4,6 tri-(methyl-N-dimethylamine) | 6 parts by weight |

The ethyl hexanoic salt of 2,4,6 tri(methyl-N-dimethylamine is available from Air Products Co. as a commercial product (anchamine K-61B TM).

The bisphenol A resin is available fro Shell Chemical Co. as EPON 828 TM. The mixture of bisphenol A epoxy resin and butyl glycidal ether is available from Shell Chemical Co. as EPON 815 TM.

| Resin #3 - Resin Composition Including 1,4-Diaminocyclohexane Hardener | |
|---|---|
| Bisphenol A epoxy resin | 100 parts by weight |
| butyl glycidal ether | 12 parts by weight |
| Silane A-1120 | 2 parts by weight |
| 1-4,diaminocyclohexane | 15 parts by weight |
| ethyl hexamoic salt of 2,4,6 tri-(methyl-N-dimethylamine) | 2 parts by weight |

Procedure

Test slurries were prepared using 250 cc of aqueous gel containing surfactant, 250 g of 20/40 mesh Ottawa sand, 7.6 cc of one of the resin formulations described above and a breaker, 0.024 g of sodium persulfate. Finally, in some tests a breaker accelerator, 0.1 cc of triethanol amine was used. Also, in some tests, a crosslinker for the aqueous gel was used. The crosslinker was 0.12 of cc of a 30% by weight solution of sodium hydroxide and fumaric acid.

The slurries were stirred for 1 minute and then poured into one or more tubes for consolidation of the sand. The tubes were glass tubes coated with a mold release agent and stopper at one end. The sand in each slurry within each tube was tamped down, clamped under mechanical pressure and then allowed to cure in a water bath at 120° F. for 20 hours. A separate amount of each slurry was placed in a separate container in the 120° F. water bath and observed to determine the time required for the gel to break. After curing, the sand consolidations contained in the glass tubes were removed by breaking the tubes and tested for compressive strength using a Tinus-Olsen press. The results of these tests are given in the Table which follows.

| Table of Test Results | | | | | |
|---|---|---|---|---|---|
| Resin | Gel Cross-linked | Sodium Persulfate Breaker in Slurry | Triethanol Amine in Slurry | Compressive Strength (psi) | Gel Break (Hrs.) |
| #1 | no | yes | no | 1500 | no break |
| #1 | no | yes | yes | 1600 | no break |

-continued

Table of Test Results

| Resin | Gel Cross-linked | Sodium Persulfate Breaker in Slurry | Triethanol Amine in Slurry | Compressive Strength (psi) | Gel Break (Hrs.) |
|---|---|---|---|---|---|
| #1 | yes | yes | yes | 100 | no break |
| #2 | no | yes | no | 900 | 20 |
| #2 | no | yes | yes | 800 | 3-4 |
| #2 | yes | yes | no | 170 | 16 |
| #2 | yes | yes | yes | 600 | 3-4 |
| #3 | no | yes | no | none | no break |
| #3 | yes | yes | yes | no coating none | 3-4 |

Thus, the present invention is well adapted to carry out the objects and attain the ends and advantages mentioned as well as those which are inherent therein. While numerous changes may be made by those skilled in the art, such changes are encompassed within the spirit of the present invention as defined by the appended claims.

What is claimed is:

1. In an improved hardenable resin composition comprising a hardenable polyepoxide rein, one or more substantially water immiscible diluents present in said resin composition in amount sufficient to lower the viscosity thereof to a desired level, and a hardening agent:
   wherein the improvement comprises said hardening agent consisting of the adduct formed by reacting an aliphatic amine with a condensation reaction product of epichlorohydrin and Bisphenol A wherein the molar quantity of amine is at least about 2 times the molar quantity of the condensation reaction product.

2. The composition of claim 1 wherein said amine is selected from the group consisting of ethylene diamine, triethylene tetramine, tetraethylene pentamine, bis-(p-aminocyclohexyl) methane, the diamines and triamines of cyclopentane and the diamines and triamines of cyclohexane.

3. The composition of claim 1 wherein said amine is selected from the group consisting of triethylene tetramine, 1,2-diamino cyclohexane and 1,4-diamino cyclohexane.

4. The composition of claim 2 wherein said polyepoxide resin is comprised of the condensation reaction product of epichlorohydrin and bisphenol A.

5. The composition of claim 4 wherein said one or more substantially water immiscible diluents include a reactive diluent selected from the group consisting of butyl glycidyl ether, cresol glycidyl ether, allyl glycidyl ether, phenyl glycidyl ether, butyl diglycidyl ether, resorcinol diglycidyl ether and mixtures of two or more of such diluents.

6. The composition of claim 5 wherein said one or more substantially water immiscible diluents include a non-reactive diluent selected from the group consisting of compounds having the structural formula:

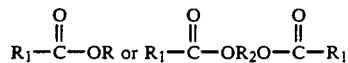

wherein R is $C_nH_{2n+1}$ in which n is an integer in the range of from 1 to about 5; $R_1$ is $C_mH_{2m+1}$ wherein m is an integer in the range of from 1 to about 4, or $R_1$ is

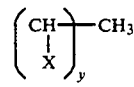

wherein y is an integer in the range of from 1 to about 4 and X is H or OH; and $R_2$ is $C_aH_{2a}$ wherein a is an integer in the range of from 2 to about 5.

7. The composition of claim which is further characterized to include an aqueous liquid in which said hardenable resin composition is dispersed.

8. The composition of claim 7 which is further characterized to include one or more surface active agents for promoting the coating of particulate material with said resin composition, said one or more surface active agents including a non-cationic surface active agent comprising at least one member selected from the group consisting of ethoxylated fatty acids produced by reacting fatty acids containing from about 12 to about 22 carbon atoms with from about 5 to about 20 moles of ethyleneoxide per mole of fatty acid and mixtures of said ethoxylated fatty acids with unreacted fatty acids.

9. The composition of claim 8 wherein said aqueous liquid includes a polysaccharide polymer gelling agent therein.

10. The composition of claim 9 which is further characterized to include particulate material suspended in said aqueous liquid which is coated with said resin composition.

11. In an improved composition useful in forming a hard permeable mass in a remote location comprising:
   an aqueous liquid;
   a gelling agent comprising at least one hydratable polysaccharide;
   a resin composition which will subsequently harden comprising a hardenable polyepoxide resin, substantially water immiscible reactive and non-reactive diluents present in said resin composition in amounts sufficient to lower the viscosity thereof to a desired level and a hardening agent;
   particulate material; and
   one or more surface active agents for promoting the coating of said particulate material with said resin composition:
   wherein the improvement comprises said hardening agent consisting of an adduct formed by reacting an eliphatic amine with a condensation reaction product of epichlorohydrin and bisphenol A wherein the molar quantity of the amine is at least about 2 times the molar quantity of the condensation reaction product.

12. The composition of claim 11 wherein said amine is selected from the group consisting of triethylene tetramine, 1,2-diamino cyclohexane and 1,4-diamino cyclohexane.

13. The composition of claim 12 wherein said polyepoxide resin is comprised of the condensation reaction product of epichlorohydrin and bisphenol A.

14. The composition of claim 13 wherein said substantially water immiscible reactive diluent comprises at least one member selected from the group consisting of butyl glycidyl ether, cresol glycidyl ether, allyl glycidyl ether, phenyl glycidyl ether, butyl diglycidyl ether, resorcinol diglycidyl ether, and mixtures of two or more of such diluents.

15. The composition of claim 14 wherein said substantially water immiscible non-reactive diluent is selected from the group consisting of compounds having the structural formula:

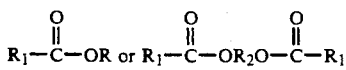

wherein R is $C_nH_{2n+1}$ in which n is an integer in the range of from 1 to about 5; $R_1$ is $C_mH_{2m+1}$ wherein m is an integer in the range of from 1 to about 4, or $R_1$ is

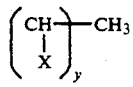

wherein y is an integer in the range of from 1 to about 4 and X is H or OH; and $R_2$ is $C_aH_{2a}$ wherein a is an integer in the range of from 2 to about 5.

16. In an improved method of continuously forming and suspending consolidatible resin composition coated particulate material in a gelled aqueous carrier liquid comprising admixing continuous streams of said gelled aqueous carrier liquid, uncrated particulate material, a resin composition which will subsequently harden and one or more surface active agents whereby said particulate material in continuously coated with said resin composition and suspended in said gelled aqueous carrier liquid, said resin composition being comprised of a hardenable polyepoxide resin, one or more substantially water immiscible diluents present in said resin composition in amounts sufficient to lower the viscosity thereof to a desired level and a hardening agent:

wherein the improvement comprises said hardening agent consisting of the adduct formed by reacting an aliphatic amine with a condensation reaction product of epichlorohydrin and bisphenol A wherein the molar quantity of the amine is at least about 2 times the molar quantity of the condensation reaction product.

17. The method of claim 16 wherein said amine is selected from the group consisting of triethylene tetramine, 1,2-diamino cyclohexane, and 1,4-diamino cyclohexane.

18. The method of claim 17 wherein said polyepoxide resin is comprised of the condensation reaction product of epichlorohydrin and bisphenol A.

19. The method of claim 18 wherein said one or more substantially water immiscible diluents include a reactive diluent selected from the group consisting of butyl glycidyl ether, cresol glycidyl ether, allyl glycidyl ether, phenyl glycidyl ether, butyl diglycidyl ether, resorcinol diglycidyl ether, and mixtures of two or more of such diluents.

20. The method of claim 19 wherein said one or more substantially water immiscible diluents include a non-reactive diluent selected from the group consisting of compounds having the structural formula:

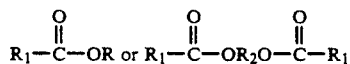

wherein R is $C_nH_{2n+1}$ in which n is an integer in the range of from 1 to about 5; $R_1$ is $C_mH_{2m+1}$ wherein m is an integer in the range of from 1 to about 4, or $R_1$ is

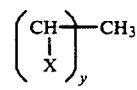

wherein y is an integer in the range of from 1 to about 4 and X is H or OH; and $R_2$ is $C_aH_{2a}$ wherein a is an integer in the range of from 2 to about 5.

* * * * *